(12) United States Patent
Huang et al.

(10) Patent No.: US 6,880,793 B2
(45) Date of Patent: Apr. 19, 2005

(54) THIN-FILM DISPLAY MOUNTING STRUCTURE

(75) Inventors: Fu-Ruei Huang, PingJen (TW); Ko-Chi Chen, PingJen (TW)

(73) Assignee: Hexa-Chain Co., Ltd., Taoyuan Hsien (TW)

( * ) Notice: Subject to any disclaimer, the term of this patent is extended or adjusted under 35 U.S.C. 154(b) by 0 days.

(21) Appl. No.: 10/653,115

(22) Filed: Sep. 3, 2003

(65) Prior Publication Data

US 2005/0045790 A1    Mar. 3, 2005

(51) Int. Cl.⁷ ............................................. F16B 45/00
(52) U.S. Cl. ...................... 248/304; 248/921; 296/1.07
(58) Field of Search ................ 248/304, 305, 248/309.1, 313, 316.7, 339, 215, 229.16, 248/229.26, 921, 917, 922; 296/37.7, 97.6, 296/1.07

(56) References Cited

U.S. PATENT DOCUMENTS

| | | | | |
|---|---|---|---|---|
| 3,954,297 A | * | 5/1976 | Linke et al. | 296/97.6 |
| 5,249,835 A | * | 10/1993 | Emoto | 296/97.6 |
| 6,575,419 B1 | * | 6/2003 | Masuda et al. | 248/371 |
| 2002/0011544 A1 | * | 1/2002 | Bosson | 248/121 |

FOREIGN PATENT DOCUMENTS

| JP | 2004-32483 | * | 1/2004 |
|---|---|---|---|
| JP | 2003-177676 | * | 6/2004 |

\* cited by examiner

*Primary Examiner*—Ramon O Ramirez
(74) *Attorney, Agent, or Firm*—Rosenberg, Klein & Lee

(57) ABSTRACT

A thin-film display mounting structure includes a thin-film display, a pivot shaft fastened pivotally with the back side of the thin-film display near the top, and two hooks fixedly fastened to the pivot shaft for hanging the thin-film display on a sun visor inside a car, or hook plates at the back of the cover of the headrest of one front seat of a car.

5 Claims, 10 Drawing Sheets

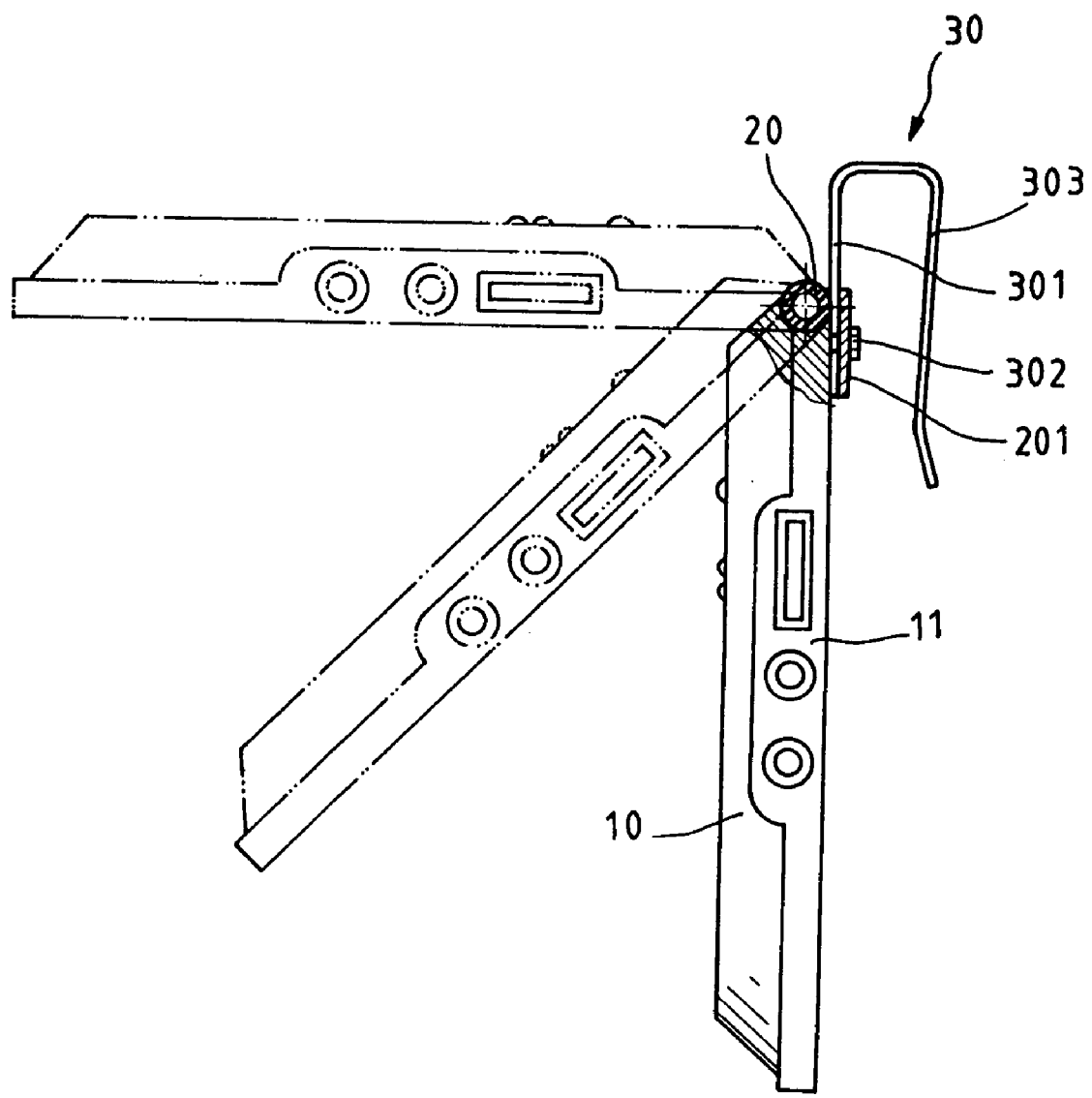
F I G. 2

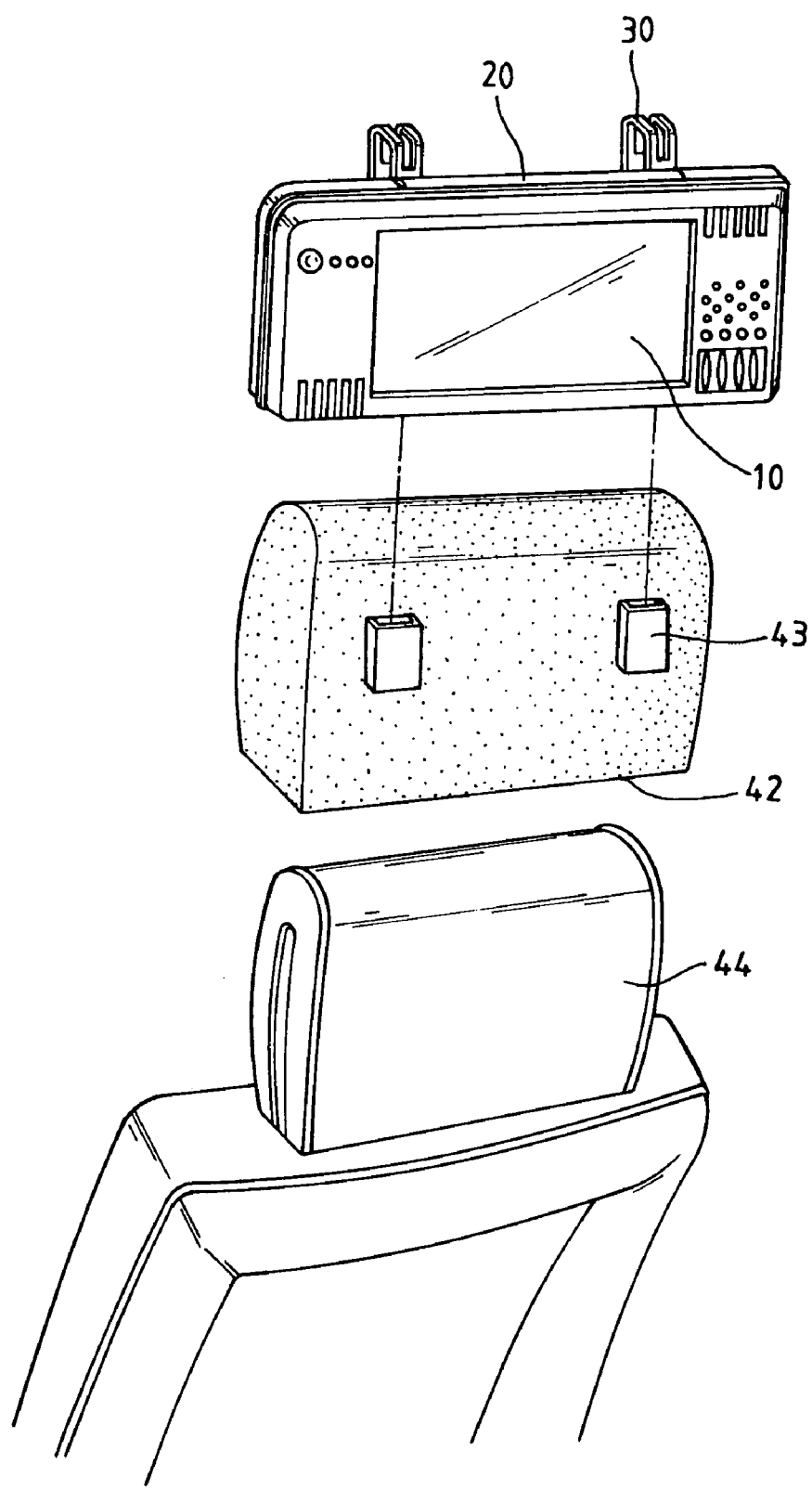
F I G. 5

THIN-FILM DISPLAY MOUNTING STRUCTURE

BACKGROUND OF THE INVENTION

1. Field of the Invention

The present invention relates to thin-film displays and, more specifically, to a thin-film display mounting structure, which enables a thin-film display to be angularly adjustably hung on any of a variety of support members.

2. Description of the Related Art

Modern motor vehicles are commonly equipped with a display device for output of video signal from, for example, a DVD player, video game machine, global positioning system, satellite navigator, etc. When wishing to install a display device in a car without display device, a display holder or the like may have to be fastened to a part inside the car to hold the display device. When installing the display holder, it may be necessary to destruct or remove a part of the car. After installation of the display holder, the display holder cannot be removed from the car for supporting the display device on a support member outside the car.

SUMMARY OF THE INVENTION

The present invention has been accomplished under the circumstances in view. It is the main object of the present invention to provide a thin-film display mounting structure, which enables the thin-film display to be hung on any of a variety of accessories inside a car. It is another object of the present invention to provide a thin-film display mounting structure, which enables the thin-film display to be hung on any of a variety of support members, or used with a rigid rack and a stand for use as a desk display device.

To achieve these and other objects of the present invention, the thin-film display mounting structure comprises a thin-film display, a pivot shaft fastened pivotally with a back side of the thin-film display, and at least one hook fastened to the pivot shaft for hanging the thin-film display on a support member, which can be a sun visor inside a car, or a headrest cover with back hook plates for a front seat in a car. A stand may be used and mounted with a rigid rack for the hanging of the hooks, for enabling the thin-film display to be supported on a bearing flange at the rigid rack.

BRIEF DESCRIPTION OF THE DRAWINGS

FIG. 2 is a schematic drawing of the present invention, showing the angular position of the thin-film display adjusted relative to the pivot shaft and the hooks.

FIG. 5 is an exploded view showing the relationship between the hooks at the pivot shaft at the back side of the thin-film display and the hook plates at the cover of the headrest of a seat.

DETAILED DESCRIPTION OF THE PREFERRED EMBODIMENT

Figure 1:
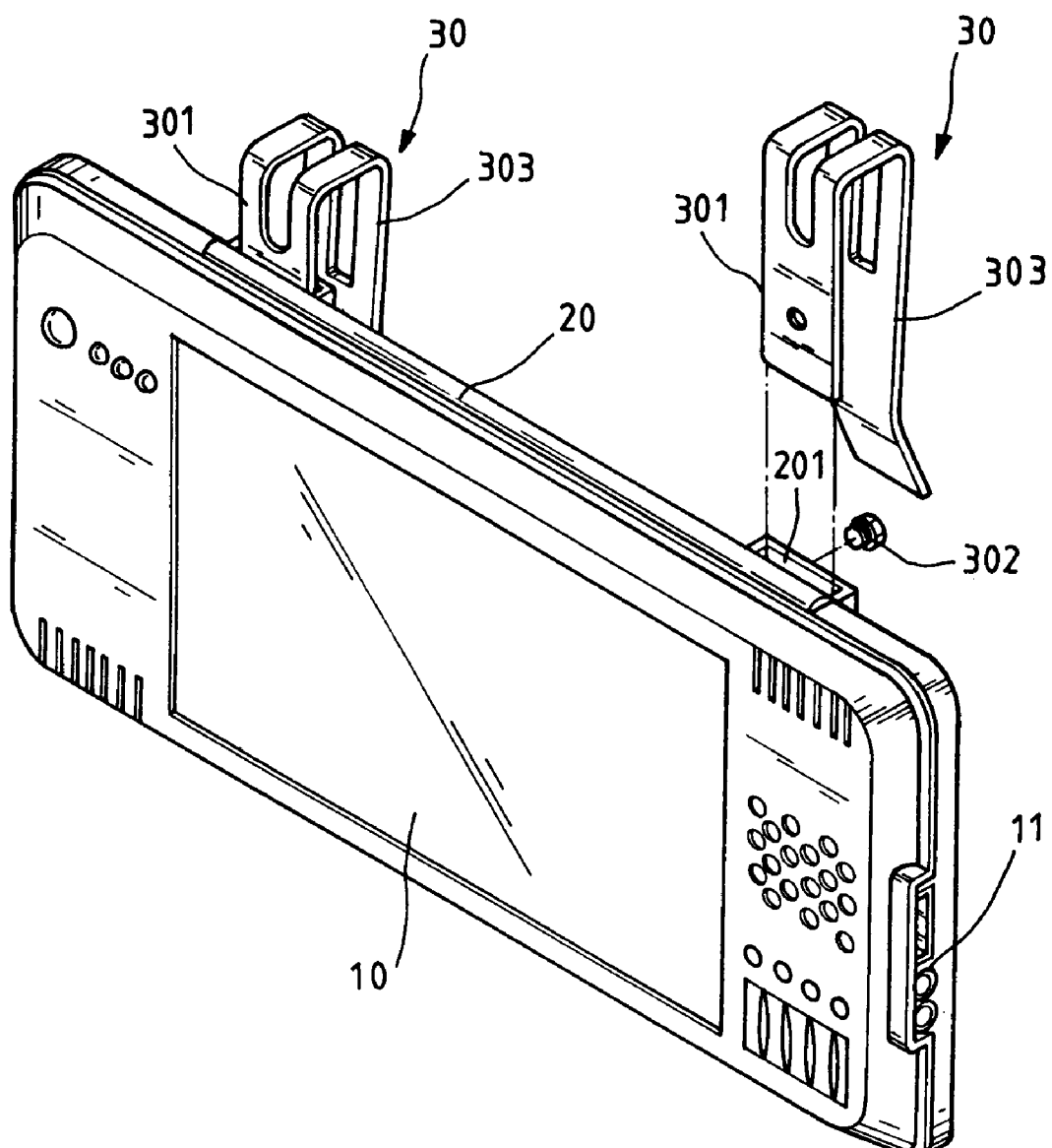
FIG. 1 is an exploded view of a thin-film display mounting structure according to the present invention.
Figure 3:
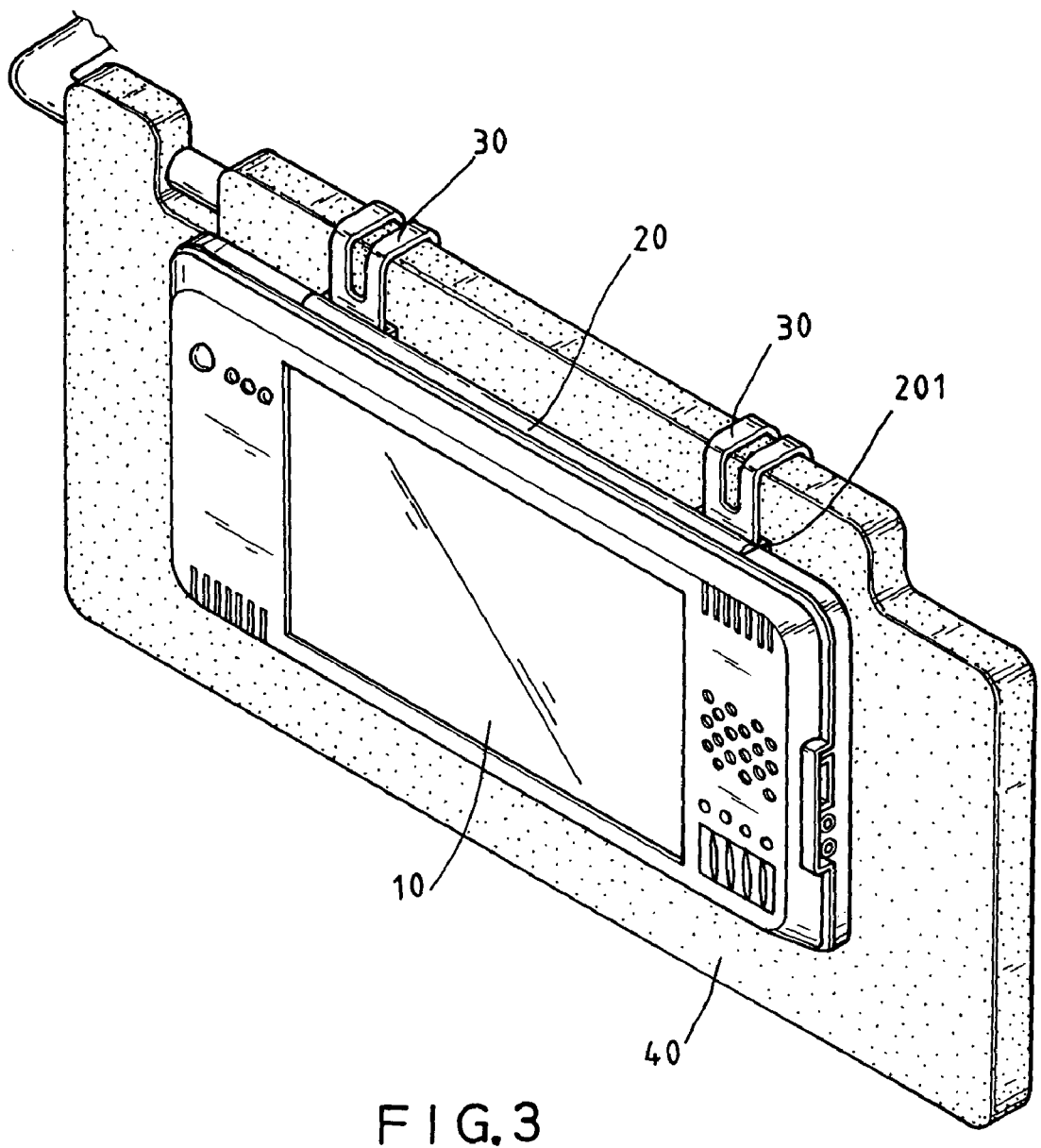
FIG. 3 shows the hooks hooked on a sun visor and the thin-film display closely attached to the sun visor according to the present invention.
Figure 4:
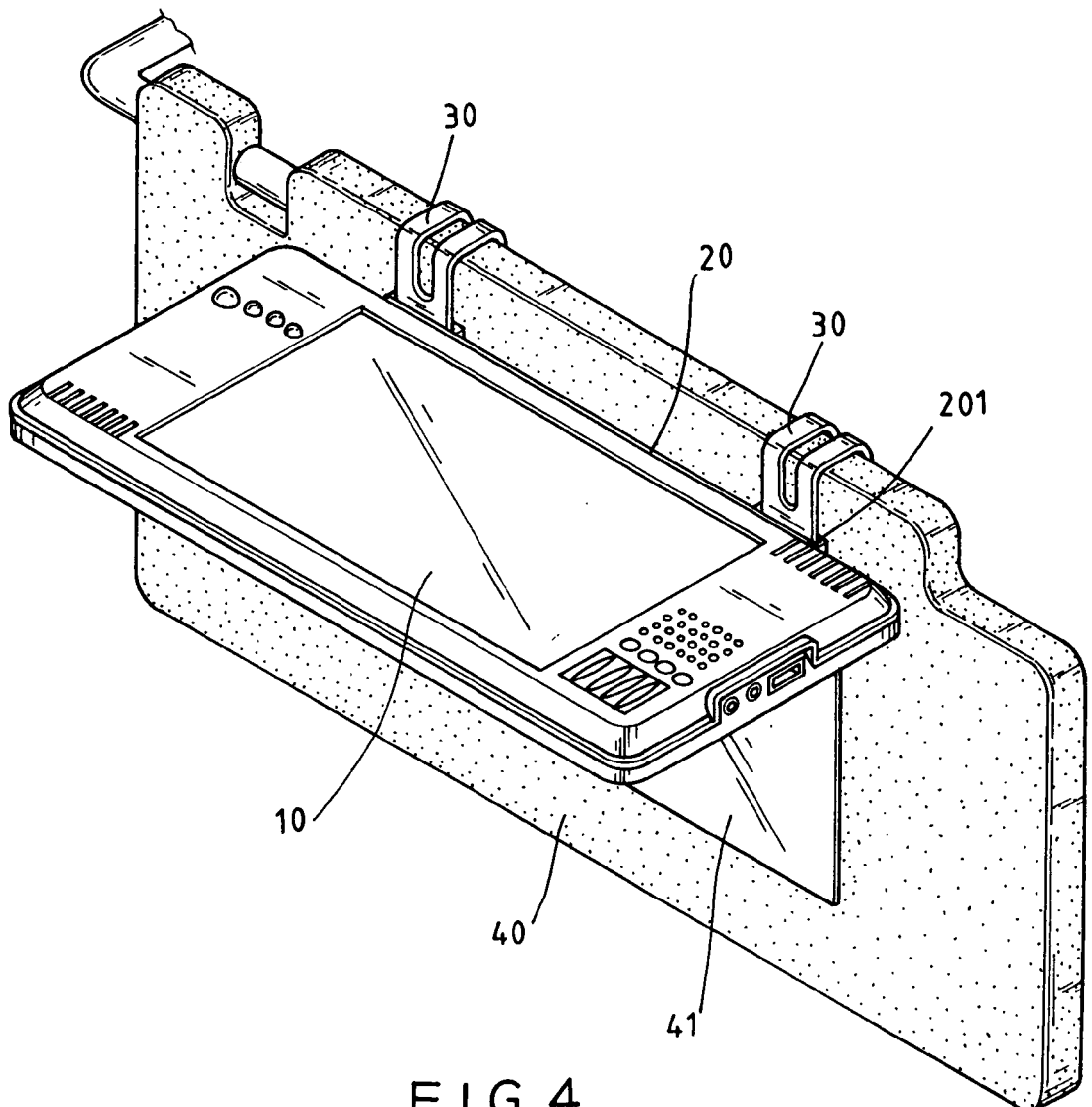
FIG. 4 is similar to FIG. 3 but showing the thin-film display turned outwards from the sun visor.

Referring to FIGS. 1 and 2, a thin-film display 10 is shown having a pivot shaft 20 pivotally disposed at the back near the top. The pivot shaft 20 has two mounting lugs 201 symmetrically disposed near the ends. Two hooks 30 are fastened to the pivot shaft 20 for mounting. The hooks 30 each have a relatively shorter rear mounting portion 301 and a relatively longer front clamping portion 303. The rear mounting portions 301 of the hooks 30 are respectively fastened to the mounting lugs 201 of the pivot shaft 20 by a respective screw 302. When assembled, the thin-film display 10 can be turned about the pivot shaft 20 relative to the hooks 30 to the desired angle (see FIG. 2).

Figure 6:
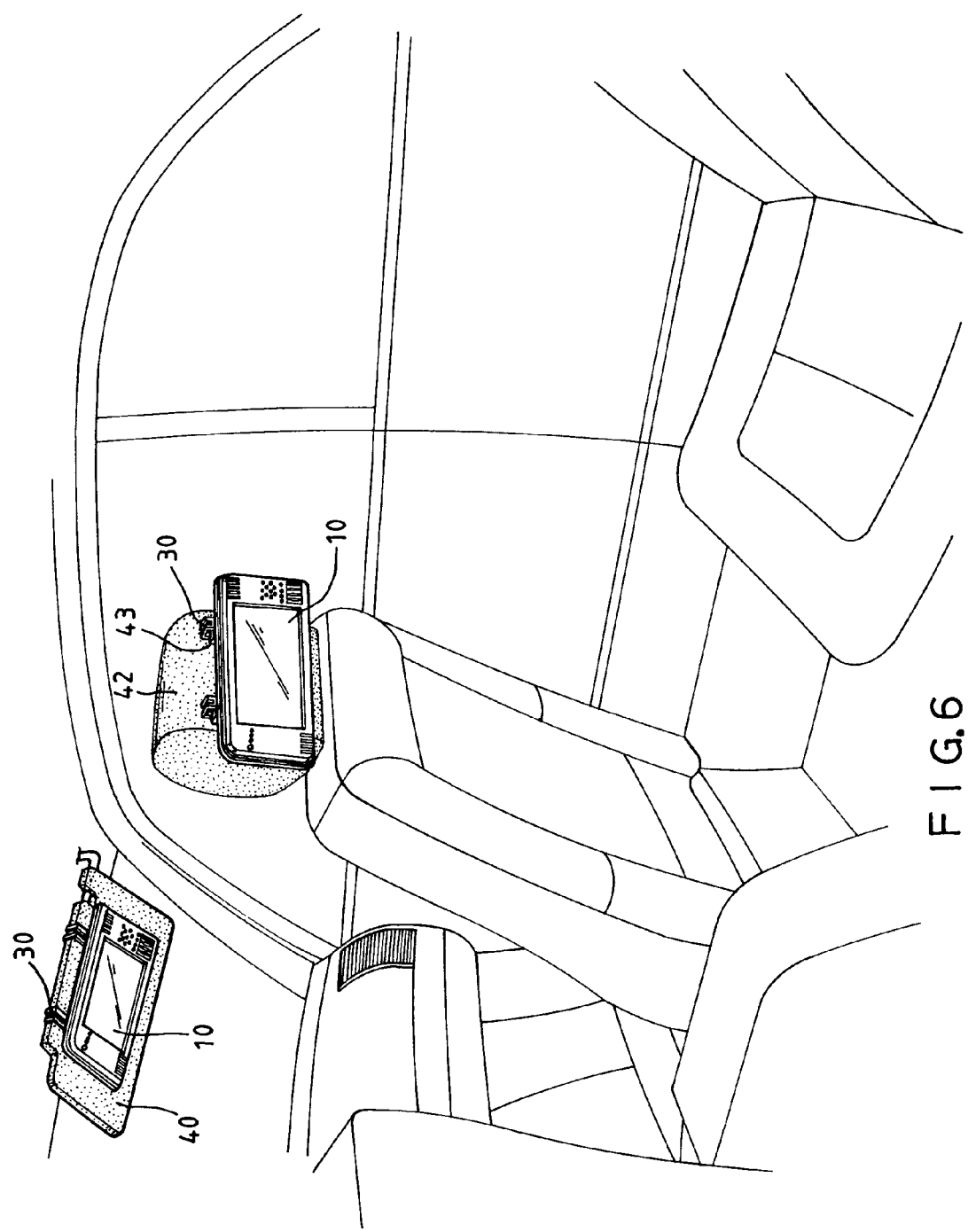
FIG. 6 shows installation examples of the present invention at a sun visor as well as the cover of the headrest of a front seat inside a car.

Referring to FIGS. 3–6, by means of the hooks 30, the thin-film display 10 can be directly hung on the sun visor 40 in front of the mirror 41 at the sun visor 40 inside the car (see FIGS. 3, 4, and 6), or hung on hook plates 43 at the back of the cover 42 of the headrest 44 of one front seat of the car (see FIGS. 5 and 6). When using the mirror 41, the thin-film display 10 is turned about the pivot shaft 20 in one direction away from the mirror 41.

Figure 7:
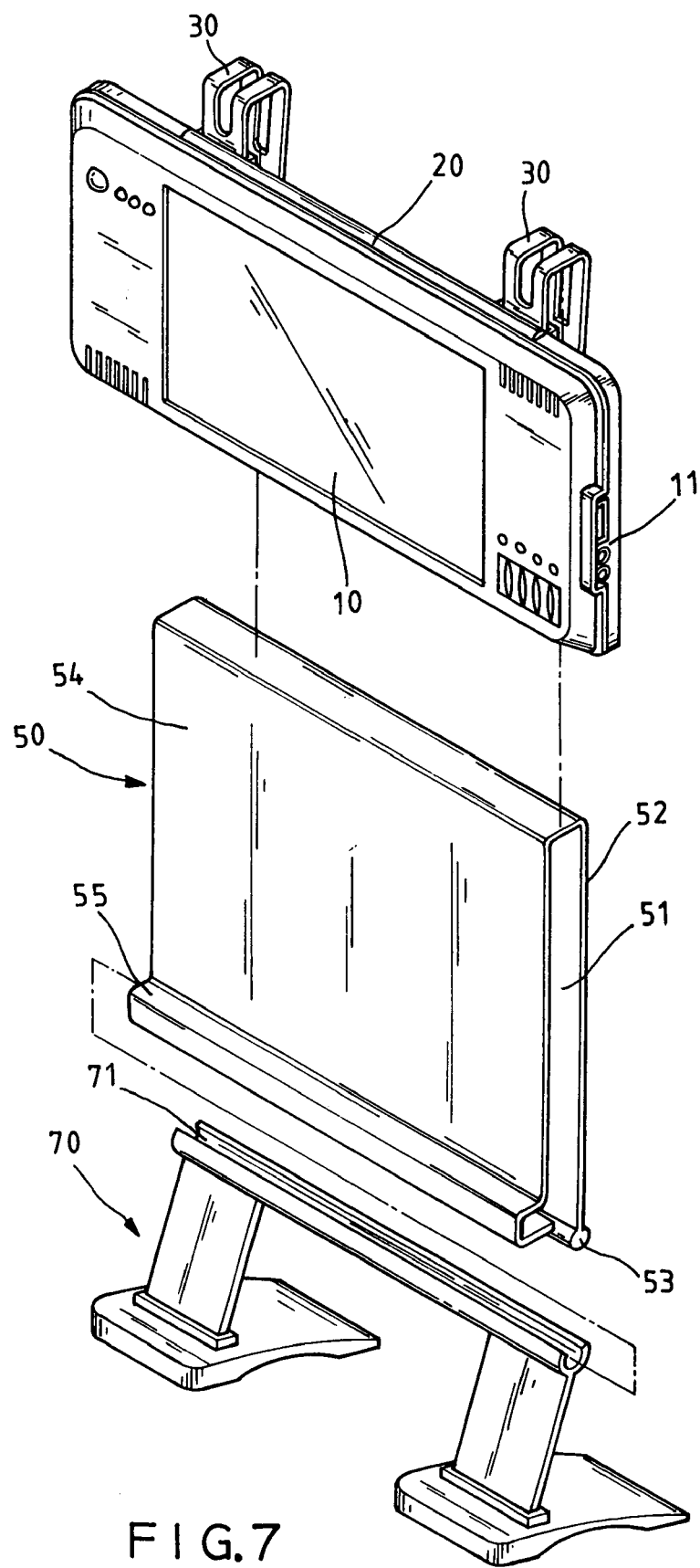
FIG. 7 is an exploded view showing the invention used with a rigid rack and a stand.
Figure 9:
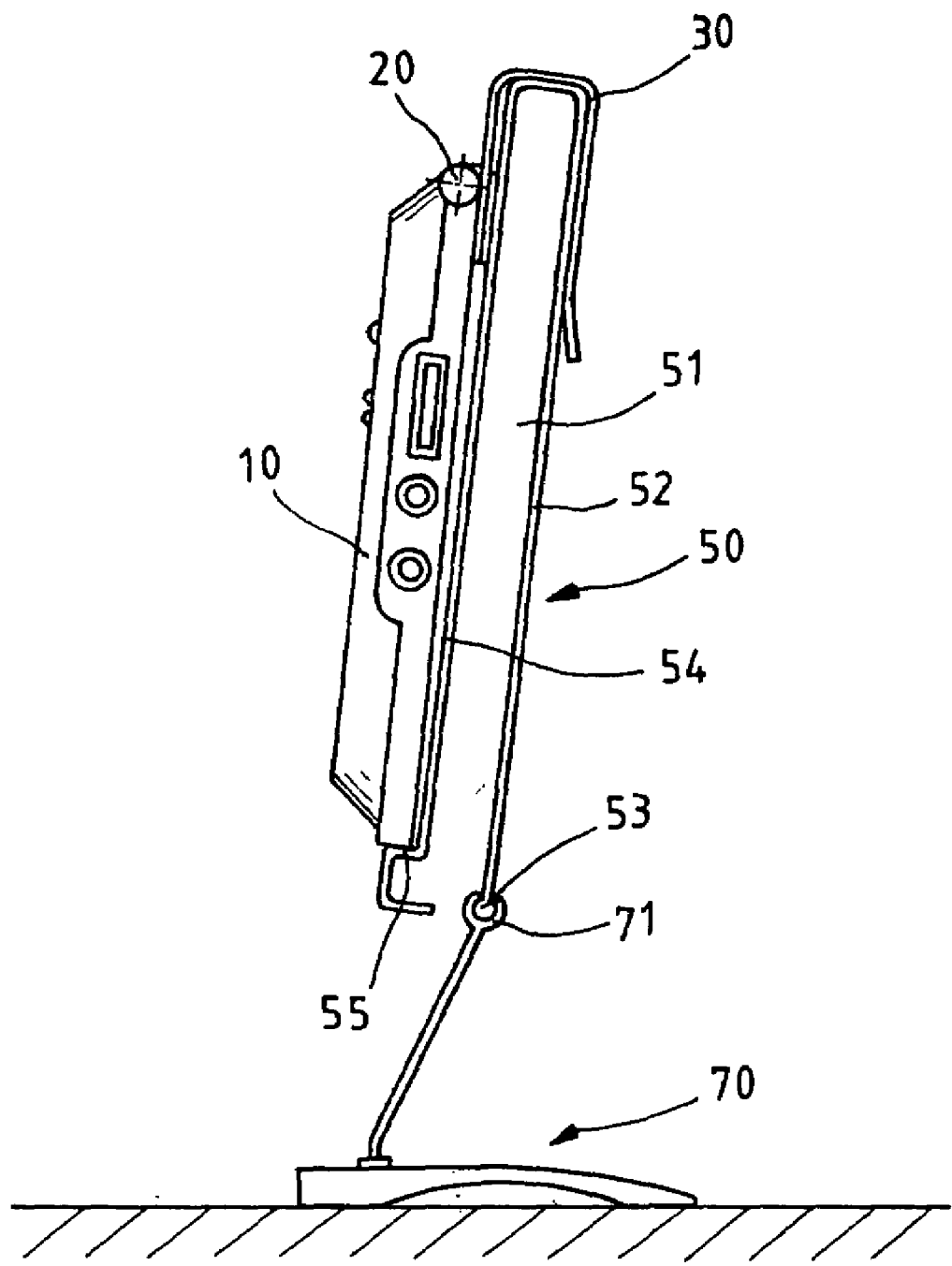
FIG. 9 is a side view of the assembly of FIG. 7.
Figure 10:
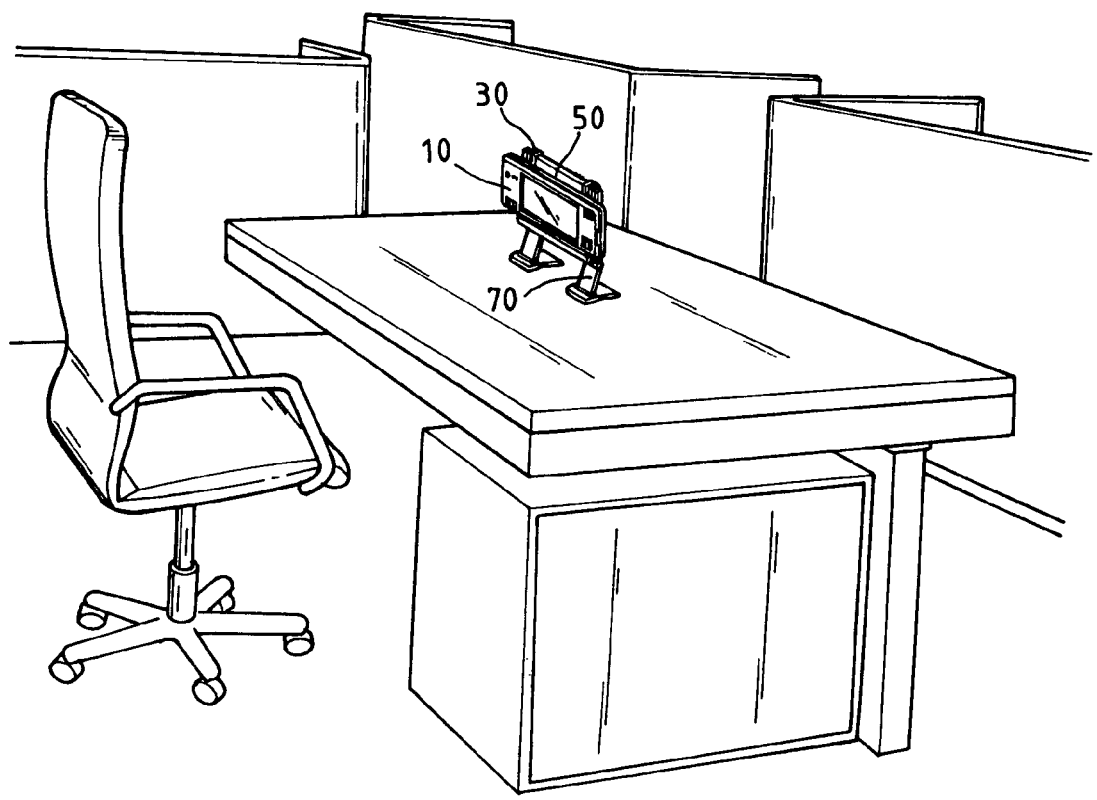
FIG. 10 shows an application example of the present invention with the rigid rack and the stand.

Referring to FIGS. 7, 9, and 10, a stand 70 is provided to support a rigid rack 50. The hooks 30 can be hung on the rigid rack 50 to support the thin-film display 10 on the rigid rack 50. The stand 70 has a horizontally extended top coupling groove 71 adapted to receive the rigid rack 50. The rigid rack 50 comprises a back panel 52, a front panel 54 extended from the top side of the back panel 52 and defining with the back panel 52 a mounting space 51, a coupling rod 53 formed integral with the bottom side of the back panel 52 and coupled to the horizontally extended top coupling groove 71 of the stand 70, and a bearing flange 55 formed integral with the bottom side of the front panel 54 and adapted to support the thin-film display 10. By means of the stand 70 and the rigid rack 50, the thin-film display 10 can be placed on a flat surface, for example, the top of a table (see FIGS. 9 and 10).

Figure 8:
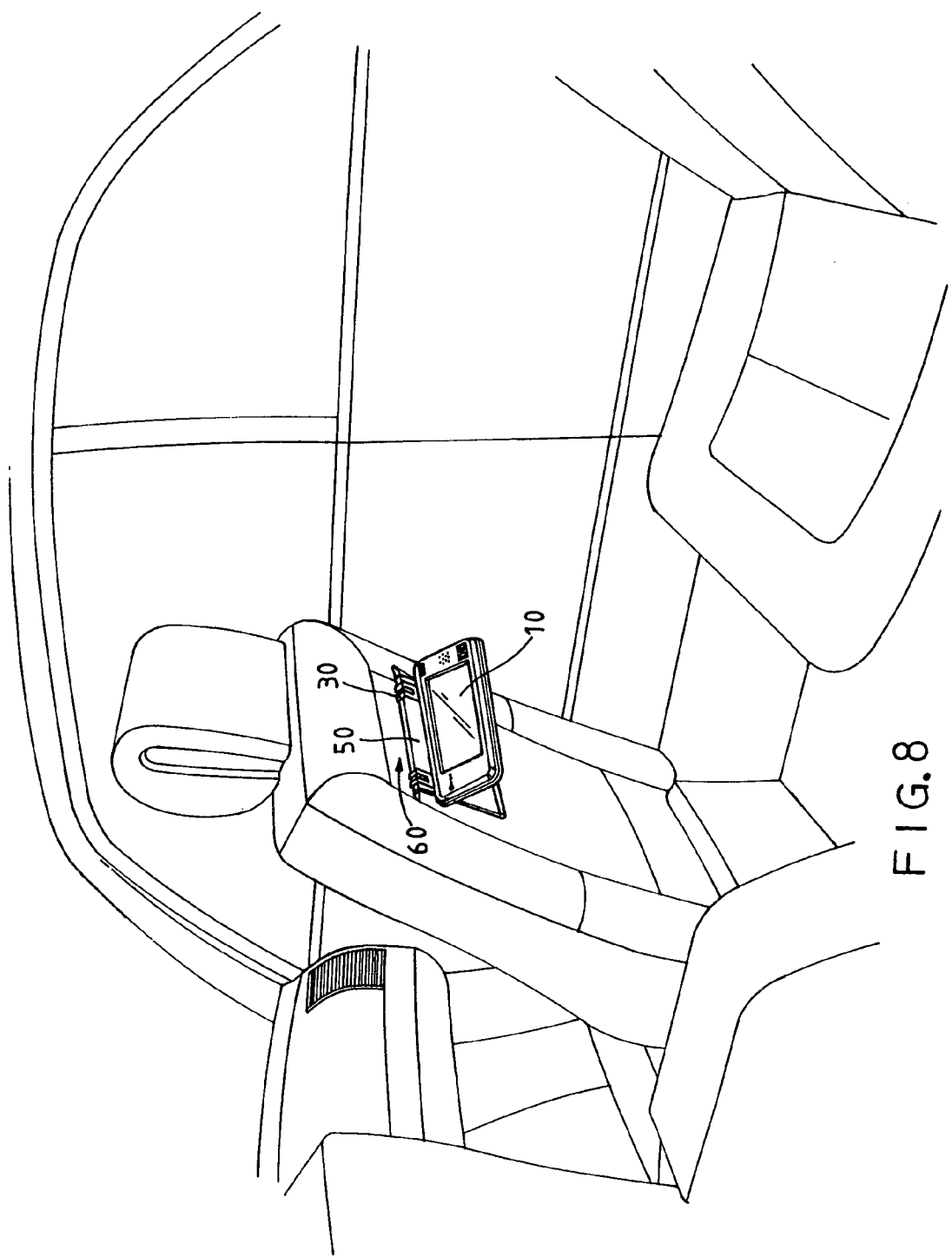
FIG. 8 shows the hooks hooked on a rigid rack hung on the back pocket of one front seat inside a car according to the present invention.

Referring to FIG. 8, the aforesaid rigid rack 50 can be separately used and hung on the back pocket 60 at the back of one front seat inside a car to support the thin-film display 10.

A prototype of thin-film display mounting structure has been constructed with the features of FIGS. 1–10. The thin-film display mounting structure functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A thin-film display mounting structure comprising:
   a thin-film display;
   a pivot shaft fastened pivotally with a back side of said thin-film display, said pivot shaft having at least one mounting lug; and at least one hook fastened to said pivot shaft for hanging said thin-film display on a support member, said at least one hook having a relatively shorter rear mounting portion fixedly secured to said at least one mounting lug of said pivot shaft and a relatively longer front clamping portion for clamping said support member.

2. The thin-film display mounting structure as claimed in claim 1, wherein said support member is a sun visor inside a car.

3. The thin-film display mounting structure as claimed in claim 1, wherein said support member is a headrest cover covered on the headrest of a seat inside a car, said headrest cover having at least one hook plate for the hanging of said at least one hook.

4. The thin-film display mounting structure as claimed in claim 1, wherein said support member is a rigid rack, said rigid rack comprising a back panel, said back panel having a top side and a bottom side, a front panel extended from the top side of said back panel and defining with said back panel a mounting space, a coupling rod formed integral with the bottom side of said back panel, and a bearing flange formed integral with a bottom side of said front panel remote from the top side of said back panel and adapted to support said thin-film display.

5. The thin-film display mounting structure as claimed in claim 4, wherein said coupling rod of said rigid rack is coupled to the horizontally extended coupling groove of a stand for enabling said thin-film display to be supported on said stand.

* * * * *